United States Patent
Fujishiro (10) Patent No.: US 7,952,313 B2
(45) Date of Patent: May 31, 2011

(54) MOTOR CONTROL APPARATUS

(75) Inventor: Naoki Fujishiro, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 12/133,961

(22) Filed: Jun. 5, 2008

(65) Prior Publication Data

US 2008/0303471 A1 Dec. 11, 2008

(30) Foreign Application Priority Data

Jun. 7, 2007 (JP) .................................. 2007-151672

(51) Int. Cl.
G05B 9/02 (2006.01)
(52) U.S. Cl. .................... 318/563; 318/432; 318/560
(58) Field of Classification Search .................. 318/432, 318/563, 560
See application file for complete search history.

(56) References Cited

U.S. PATENT DOCUMENTS

| | | | |
|---|---|---|---|
| 4,305,031 A | 12/1981 | Wharton | |
| 7,474,071 B2* | 1/2009 | Koeppl et al. | 318/489 |
| 7,741,792 B2* | 6/2010 | Fujishiro et al. | 318/34 |
| 2004/0041485 A1 | 3/2004 | Horber | |
| 2004/0055567 A1* | 3/2004 | Doelker et al. | 123/350 |
| 2004/0119373 A1 | 6/2004 | Akatsu | |
| 2006/0247829 A1* | 11/2006 | Sato | 701/22 |
| 2007/0132423 A1* | 6/2007 | Ajima et al. | 318/719 |

FOREIGN PATENT DOCUMENTS

| | | |
|---|---|---|
| EP | 1 191 673 A2 | 3/2002 |
| EP | 1 248 342 A | 10/2002 |
| JP | 55-153300 A | 12/1981 |
| JP | 2002-204541 A | 7/2002 |
| JP | 2007203876 A * | 8/2007 |

* cited by examiner

*Primary Examiner* — Bentsu Ro
*Assistant Examiner* — Kawing Chan
(74) *Attorney, Agent, or Firm* — Arent Fox LLP (57) ABSTRACT

A motor control apparatus includes: an electric motor having an outer rotor and an inner rotor which can alter mutual relative phases; a phase alternation device which alters the relative phase; a phase position sensor which detects a phase position with respect to the relative phase; and a fail-decision control unit which sets the relative phase as a maximum value or a minimum value (that is, a most forcing phase and a most weakening phase) in a phase variable area of the phase alternation device in accordance with a rotation number of the electric motor when the phase position sensor does not work.

4 Claims, 10 Drawing Sheets

MOTOR CONTROL APPARATUS

TECHNICAL FIELD

The present invention is relates to a motor control apparatus.

Priority is claimed on Japanese Patent Application No. 2007-151672, filed Jun. 7, 2007, the content of which is incorporated herein by reference.

BACKGROUND OF THE INVENTION

Conventionally, a permanent magnet rotational electric motor is known in which there are provided a first rotor and a second rotor that are provided concentrically around an axis of rotation of an electric motor, and the relative positions in the circumferential direction of the first rotor and the second rotor, namely, the phase difference thereof are controlled in accordance with the rotational speed of the rotational electric motor, or in accordance with the speed of a rotating magnetic field that is generated in a stator (see, for example, Japanese Unexamined Patent Application, First Publication No. 2002-204541).

In addition, conventionally, a motor is known in which there are provided a first permanent magnetic pole piece and a second permanent magnetic pole piece which can alter mutual phase positions thereof by a servo pressure, and an amount of field flux thereof can be altered (see, for example, Japanese Unexamined Patent Application, First Publication No. S55-153300).

In the motor according to the above conventional art, there is a concern that motor power cannot be appropriately controlled if a sensor which detects a phase position does not work, in a case in which the motor power is controlled in accordance with a detection value of the sensor.

For example, if using the nonworking sensor is stopped and controlling of phase is forbidden, the phase position cannot be known. As a result, the available power of the motor according to the phase position cannot be known, and the available power which can be controlled is excessively decreased. Therefore, desired amount of power cannot be maintained.

SUMMARY OF THE INVENTION

The present invention is conceived in view of the above circumstances, and has an object to provide a motor control apparatus which can control motor power appropriately even if a sensor which detects a phase position does not work.

In order to solve the above problems and achieve the object, the motor control apparatus according to a first aspect of the present invention includes: an electric motor having a plurality of rotors which can alter mutual relative phases; a phase alternation device which alters the relative phase; a phase position sensor which detects a phase position with respect to the relative phase; a fail-detection device which detects a failure of the phase position sensor; and a switch setting device which sets the relative phase as a maximum value or a minimum value in a phase variable area of the phase alternation device in accordance with a rotational speed of the electric motor when a phase position sensor does not work.

According to the motor control apparatus of the first aspect, even in a case in which a detection value of the phase position cannot be obtained when the phase position sensor does not work, the phase alternation device can set the phase position alternatively as either the maximum value or the minimum value in the phase variable area. Therefore, motor power can be controlled in accordance with the phase position which is set alternatively as the maximum value or the minimum value in the phase variable area. As a result, an available power of the electric motor can be prevented from being reduced excessively; thereby ensuring a prescribed amount of power.

Furthermore, the phase position is set alternatively as the maximum value or the minimum value in the phase variable area in accordance with the rotational speed of the electric motor. For example, when the rotational speed of the electric motor is relatively fast, the phase position is set to a position of field weakening; and when the rotational speed of the electric motor is relatively slow, the phase position is set to a position of field forcing. Therefore, a prescribed amount of power can be appropriately ensured.

The motor control apparatus may further include a torque setting device which sets a torque instruction value of the electric motor to zero immediately after the fail-detection device detects a failure in the phase position sensor.

In this case, for example, inappropriate actions such as an excessive increase in the motor torque, a vibration, and the like can be prevented by setting a torque instruction value of the electric motor to zero immediately after detecting a failure of the phase position sensor.

A motor control apparatus according to a second aspect of the present invention includes: an electric motor having a plurality of rotors which can alter mutual relative phases; a phase alternation device which alters the relative phase; a phase position sensor which detects a phase position with respect to the relative phase; a fail-detection device which detects a failure of the phase position sensor; and a switch setting device which sets the relative phase to a maximum value or a minimum value of a phase variable area of the phase alternation device in accordance with a field weakening current instruction when the phase position sensor does not work.

According to the motor control apparatus of the second aspect, even in a case in which a detection value of the phase position cannot be obtained when the phase position sensor does not work, the phase alternation device can set the phase position alternatively as either the maximum value or the minimum value in the phase variable area. Therefore, motor power can be controlled in accordance with the phase position which is set alternatively as the maximum value or the minimum value in the phase variable area. As a result, an available power of the electric motor can be prevented from being reduced excessively; thereby ensuring a prescribed amount of power.

Furthermore, the phase position is set alternatively as the maximum value or the minimum value in the phase variable area in accordance with the field weakening current instruction. For example, when the field weakening current instruction is relatively large, the phase position is set to a position of field weakening; when the field weakening current instruction is relatively small, the phase position is set to a position of field forcing. Therefore, a prescribed amount of power can be appropriately ensured.

A motor control apparatus according to a third aspect of the present invention includes: an electric motor having a plurality of rotors which can alter mutual relative phases; a phase alternation device which alters the relative phase; a phase position sensor which detects a phase position with respect to the relative phase; a fail-detection device which detects a failure of the phase position sensor; and a switch setting device which sets the relative phase to a maximum value or a minimum value in a phase variable area of the phase alternation device in accordance with a rotation property of a vehicle which is provided with the electric motor when the phase position sensor does not work.

According to the motor control apparatus of the third aspect, even in a case in which a detection value of the phase position cannot be obtained when the phase position sensor does not work, the phase alternation device can set the phase position alternatively as either the maximum value or the minimum value in the phase variable area. Therefore, motor power can be controlled in accordance with the phase position which is set alternatively as the maximum value or the minimum value in the phase variable area. As a result, an available power of the electric motor can be prevented from being reduced excessively; thereby ensuring a prescribed amount of power.

Furthermore, the phase position is set alternatively as the maximum value or the minimum value in the phase variable area in accordance with a rotation property of a vehicle (for example, rotational speed of a drive shaft). For example, when the rotational speed of the drive shaft is relatively fast, the phase position is set to a position of field weakening; when the rotational speed of the drive shaft is relatively slow, the phase position is set to a position of field forcing. Therefore, a prescribed amount of power can be appropriately ensured.

DETAILED DESCRIPTION OF THE INVENTION

An embodiment of a motor control apparatus of the present invention will be described below with reference to the drawings.

Figure 1:
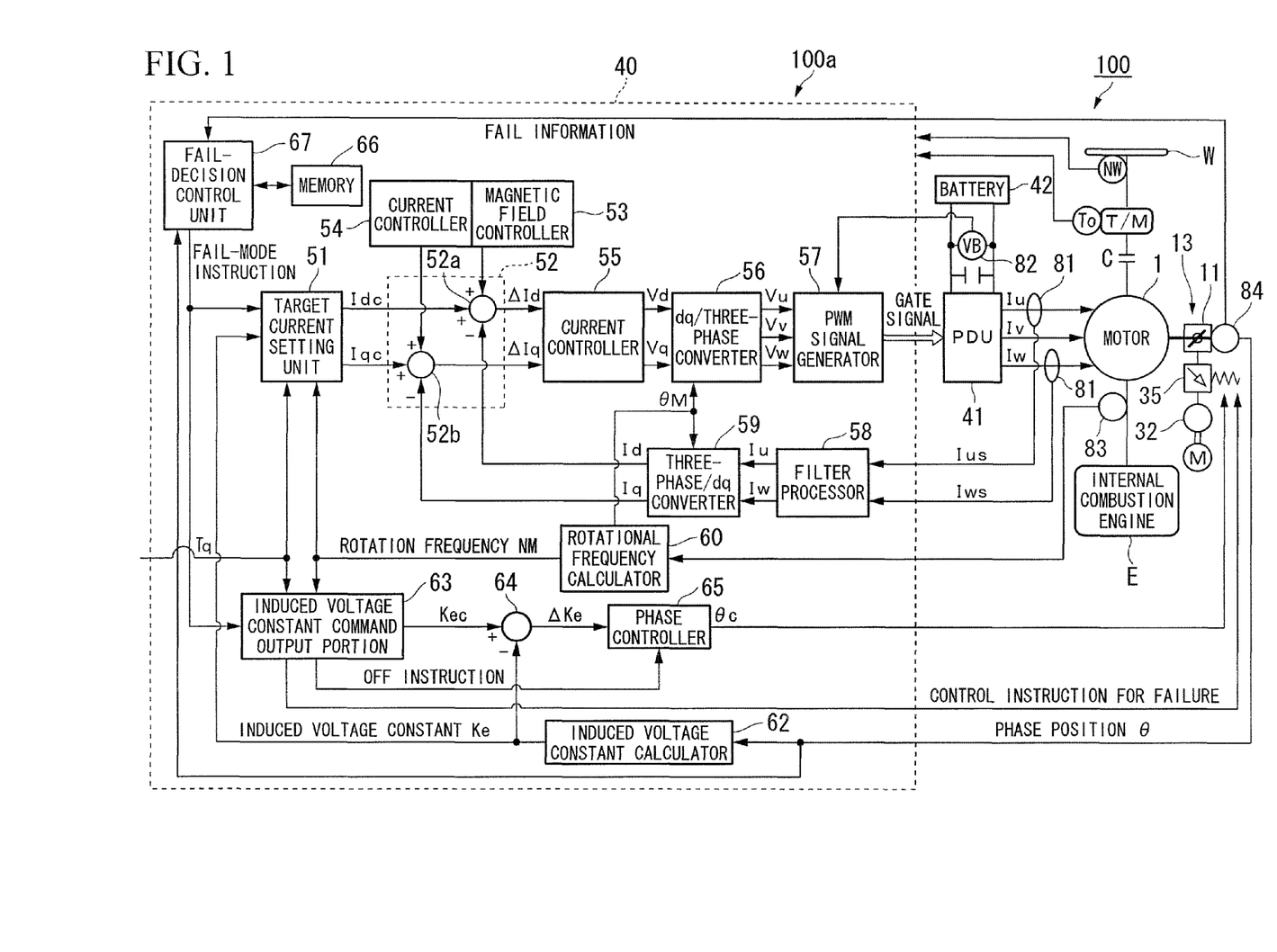
FIG. 1 is a schematic view showing the structure of a vehicle according to an embodiment of the present invention.

The motor control apparatus of the present embodiment is mounted as a controller in a vehicle such as a hybrid vehicle or an electric vehicle that is provided with a motor as the traveling driving device. Specifically, as shown in FIG. 1, a vehicle 100 that is mounted with a motor control apparatus 100a (hereinafter, "control apparatus 100a"), is a parallel hybrid vehicle that is provided with a motor 1 and an internal combustion engine E as driving sources. The motor 1, the internal combustion engine E and a transmission T/M are connected in series, and at least the drive force of the motor 1 or the internal combustion engine E is transmitted to driving wheels W of the vehicle 100 via a clutch C and the transmission T/M.

When drive force is transmitted from the driving wheels W side to the motor 1 during deceleration of the vehicle 100, the motor 1, by functioning as a generator, generates so-called regenerative brake force and recovers the kinetic energy of the vehicle body as electrical energy (regenerated energy). Also, even when the power of the internal combustion engine E is transmitted to the motor 1, the motor 1 functions as a generator and generates electrical energy.

Here, various sensors such as an accelerator pedal opening sensor (not shown), a brake pedal switch sensor (not shown), a wheel speed sensor NW, a liquid temperature sensor To and the like are provided in the vehicle 100 in which is provided the control apparatus 100a. Based on the detection results of these sensors, the control apparatus 100a outputs a control instruction to the respective control systems of the internal combustion engine E, the motor 1, the clutch C, and the transmission T/M.

As shown for example in FIG. 2 to FIG. 5, the motor 1 is an inner rotor-type brushless motor in which a rotor unit 3 is arranged on the inner circumference side of an annular stator 2.

The stator 2 has stator windings 2a of a plurality of phases, and the rotor unit 3 has a rotation axis 4 in the axis portion. The rotating force of the motor 1 is transmitted to the driving wheels W via the clutch C and the transmission T/M.

The rotor unit 3 is, for example, provided with an annular outer rotor 5 and an annular inner rotor 6 that is coaxially disposed on the inner side of the outer rotor 5, with the outer rotor 5 and the inner rotor 6 being relatively rotatable in the range of a predetermined set angle.

In the outer rotor 5 and the inner rotor 6, annular rotor cores 7 and 8, which are the respective rotor bodies, are formed out of sintered metal, and at a position shifted to the outer circumference side of the rotor cores 7 and 8, a plurality of magnet mounting slots 7a and 8a are formed at intervals in the circumferential direction. Two flat plate permanent magnets 9 that are magnetized in the thickness direction are mounted side-by-side in the magnet mounting slots 7a and 8a. The two permanent magnets 9 that are mounted in the magnet mounting slots 7a and 8a are magnetized in the same direction, and the pairs of permanent magnets 9 that are mounted in the magnet mounting slots 7a and 8a are set so that their magnetic pole orientations are reversed. That is, in the rotors 5 and 6, a pair of the permanent magnets 9 in which the outer circumference side is the N pole, and a pair of the permanent magnets 9 in which the outer circumference side is the S pole are alternately arranged in the circumferential direction. Note that a cutaway portion 10 is formed along the axial direction of the rotors 5 and 6 for controlling (for example, suppressing magnetic path short cutting) the flow of magnetic flux of the permanent magnets 9 between each of the magnet mounting slots 7a and 8a that are adjacent on the outer circumference side of the rotors 5 and 6.

The same number of magnet mounting slots 7a and 8a are provided in the outer rotor 5 and the inner rotor 6, and so that permanent magnets 9 of both rotors 5 and 6 have a "1 to 1" correspondence. Accordingly, by making the pairs of permanent magnets 9 in the magnet mounting slots 7a and 8a of the outer rotor 5 and the inner rotor 6 face the same pole (different polarity arrangement), it is possible to obtain a weak magnetic field state in which the magnetic field of the entire rotor unit 3 is most weakened (for example, refer to FIG. 5 and FIG. 6B). Also, by making the pairs of permanent magnets 9 in the magnet mounting slots 7a and 8a of the outer rotor 5 and the inner rotor 6 face mutually different poles (same polarity arrangement), it is possible to obtain a strong magnetic field state in which the magnetic field of the entire rotor unit 3 is most strengthened (for example, refer to FIG. 3 and FIG. 6A).

Also, the rotor unit 3 is provided with a rotation mechanism 11 for relatively rotating the outer rotor 5 and the inner rotor 6. This rotation mechanism 11 constitutes a portion of a phase changing device 12 for arbitrarily changing the relative phase of the outer rotor 5 and the inner rotor 6, and is operated by the pressure of hydraulic fluid that is a non-compressive hydraulic fluid (for example, lubricating oil for the transmission T/M and engine oil, etc.).

Figure 7:
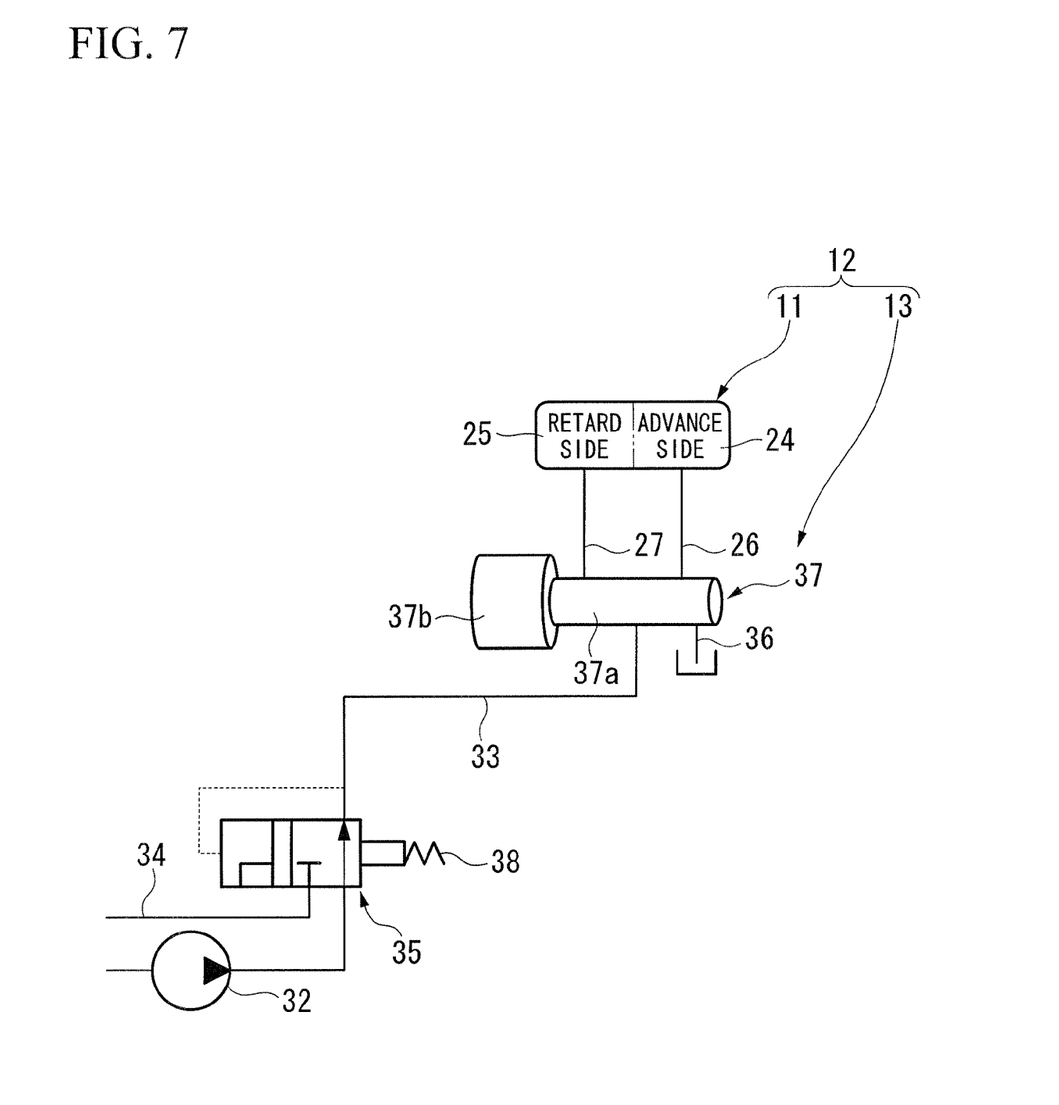
FIG. 7 is a lineblock drawing showing a hydraulic pressure control device according to the embodiment of the present invention.

The phase changing device 12 is as shown in FIG. 7 for example, constituted to be provided with the rotation mechanism 11 and a hydraulic pressure control device 13 that controls the pressure of the hydraulic fluid that is supplied to the rotation mechanism 11 as main elements.

The rotation mechanism 11 is as shown in FIG. 2 to FIG. 5 for example, provided with a vane rotor 14 that is spline engaged to be integrally rotatable on the outer circumference of the rotation axis 4, and an annular housing 15 that is disposed to be relatively rotatable on the outer circumference side of the vane rotor 14. The annular housing 15 is integrally engaged and fixed to the inner circumference surface of the inner rotor 6, and the vane rotor 14 is integrally joined to the outer rotor 5 via a pair of disk-shaped drive plates 16, 16 that straddle the side end portions of both sides of the annular housing 15 and the inner rotor 6. Accordingly, the vane rotor 14 is integrated with the rotation axis 4 and the outer rotor 5, and the annular housing 15 is integrated with the inner rotor 6.

In the vane rotor 14, a plurality of vanes 18 projecting to the outside in the radial direction are provided in the circumferential direction at regular intervals on the outer circumference of a cylindrical boss portion 17 that is spline engaged to the rotation axis 4. On the other hand, a plurality of concave portions 19 are provided in the circumferential direction at regular intervals on the inner circumferential surface of the annular housing 15, and the corresponding vanes 18 of the vane rotor 14 are arranged to be accommodated in the concave portions 19. Each concave portion 19 is constituted by a bottom wall 20 that has an arc surface that substantially matches the rotation track of the distal end portion of the vane 18, and a protrusion 21 that has substantially a triangular section and separates neighboring concave portions 19. During relative rotation of the vane rotor 14 and the annular housing 15, the vane 18 can be displaced between one protrusion 21 and another protrusion 21 which are adjacent to each other.

In the present embodiment, the protrusions 21, by making contact with the vanes 18, function as regulating members that regulate the relative rotation of the vane rotor 14 and the annular housing 15. Note that a seal member 22 is provided along the axial direction at the distal end portion of each vane 18 and the distal end portion of the protrusion 21, and that with these seal members 22, each space between the vane 18 and the bottom wall 20 of the concave portion 19, and between the protrusion 21 and the outer circumference surface of the boss portion 17 is sealed liquid tight.

Figure 2:
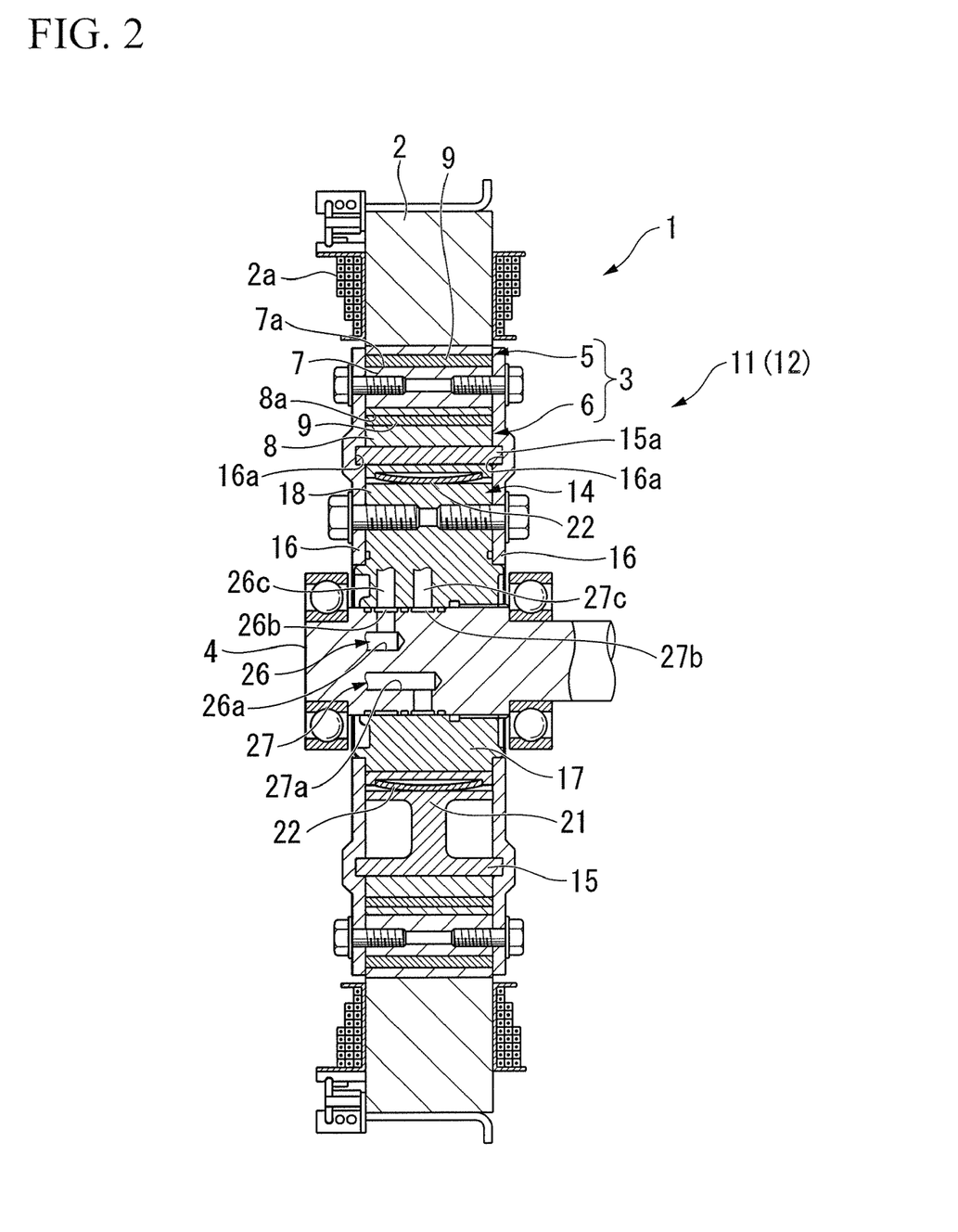
FIG. 2 is an essential sectional view showing a motor according to the embodiment of the present invention.

Also, a base portion 15a of the annular housing 15 that is fixed to the inner rotor 6 is formed in a cylindrical shape of a fixed thickness, and as shown for example in FIG. 2, projects outward in the axial direction with respect to the inner rotor 6 and the partition walls 21. Each end portion that projects to the outer side of this base portion 15a is held in a freely slidable manner in an annular guide groove 16a that is formed in the drive plates 16, and so the annular housing 15 and the inner rotor 6 are supported in a floating state by the outer rotor 5 and the rotation axis 4.

The drive plates 16 of both sides that couple the outer rotor 5 and the vane rotor 14 make close contact in a freely slidable manner with both side surfaces of the annular housing 15 and block off the sides of each concave portion 19 of the annular housing 15. Accordingly, in each concave portion 19, an independent space portion is formed by the boss portion 17 of the vane rotor 14 and the drive plates 16 of both sides, and this space portion becomes an introduction space 23 where operating fluid is introduced. Each introduction space 23 is divided into two rooms by each corresponding vane 18 of the vane rotor 14, with one room being an advance operation chamber 24 and the other room being a retard operation chamber 25.

The advance operation chamber 24 relatively rotates the inner rotor 6 in the advance direction with respect to the outer rotor 5 by the pressure of the operating fluid that is introduced therein, and the retard operation chamber 25 relatively rotates the inner rotor 6 in the retard direction with respect to the outer rotor 5 by the pressure of the operating fluid that is introduced therein.

Figure 3:
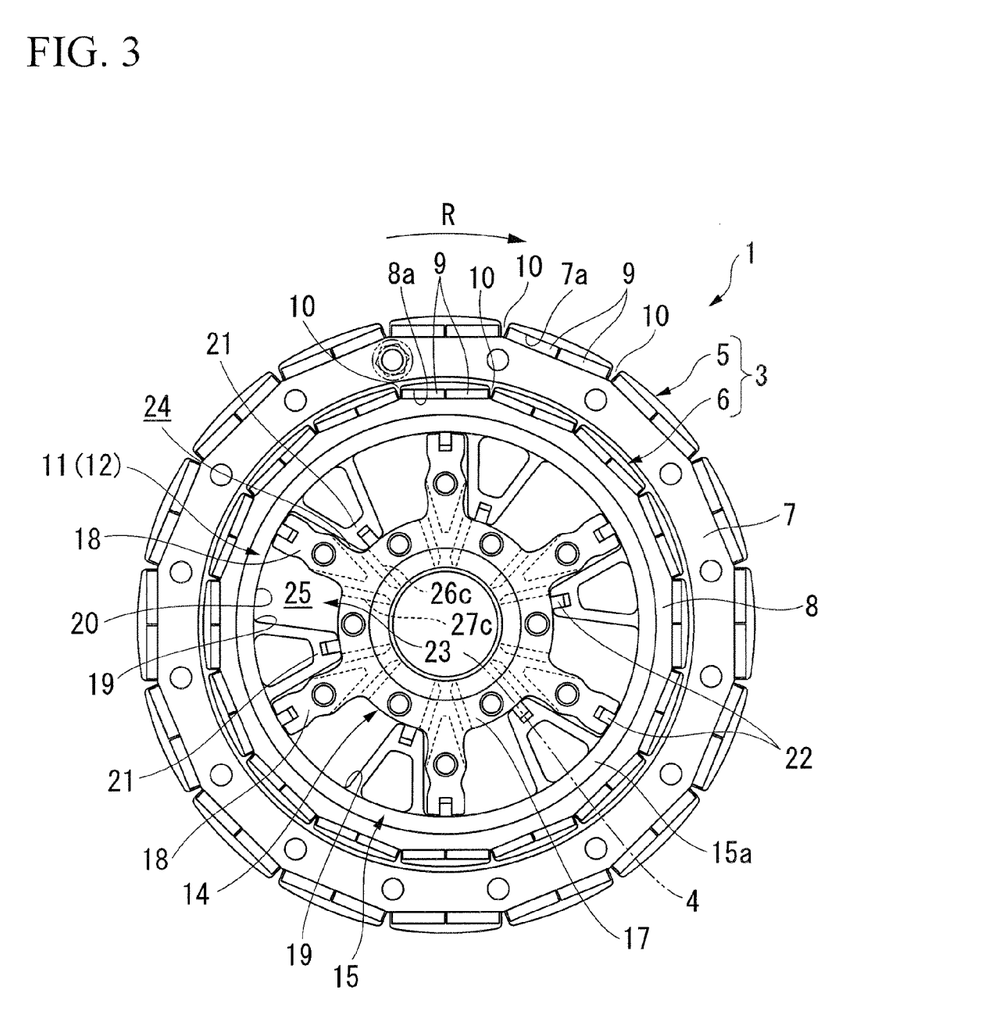
FIG. 3 is a side view that excludes some components, showing a rotor unit which is controlled to a most retard position of the motor according to the embodiment of the present invention.
Figure 4:
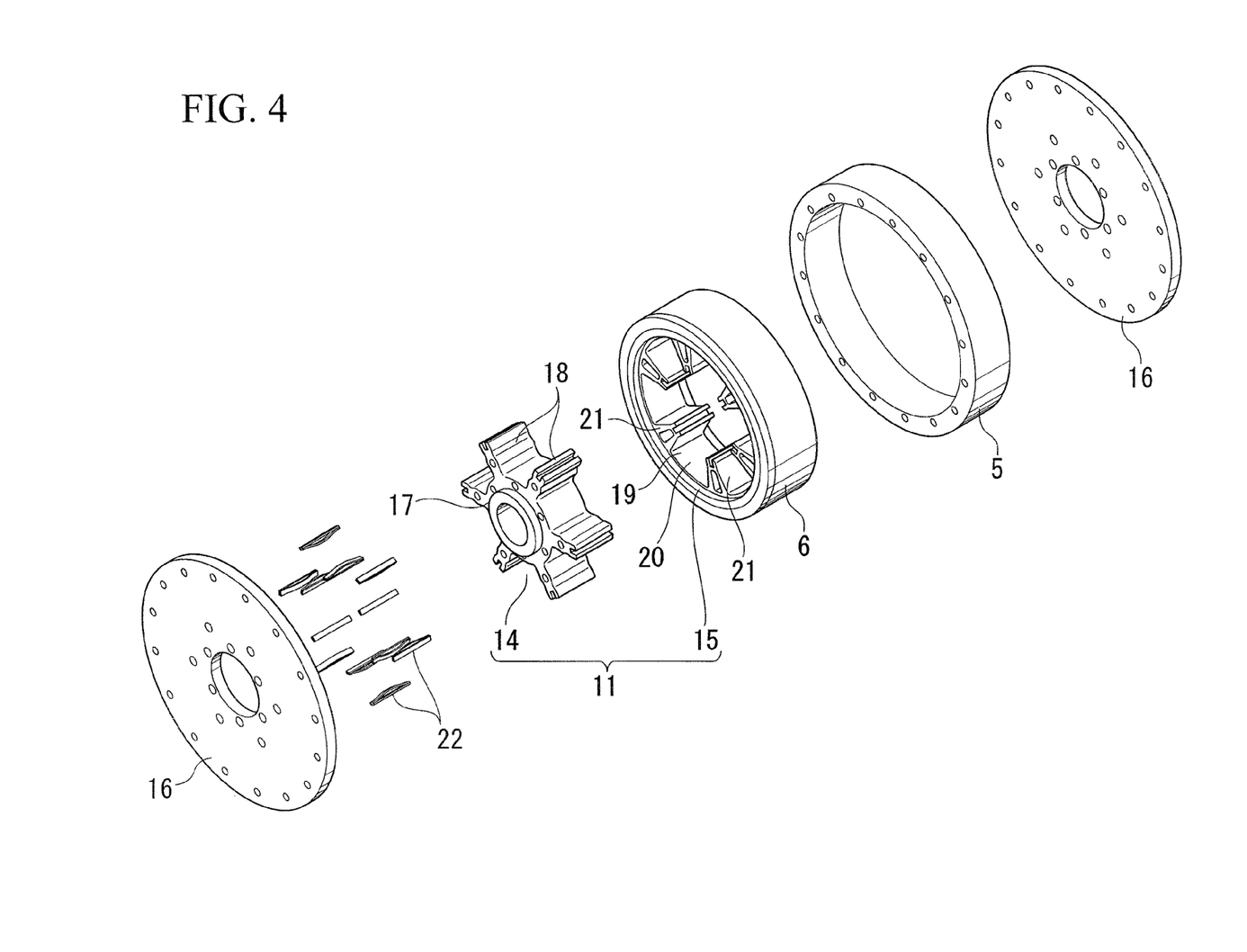
FIG. 4 is an exploded perspective view showing the rotor unit of the motor according to the embodiment of the present invention.
Figure 5:
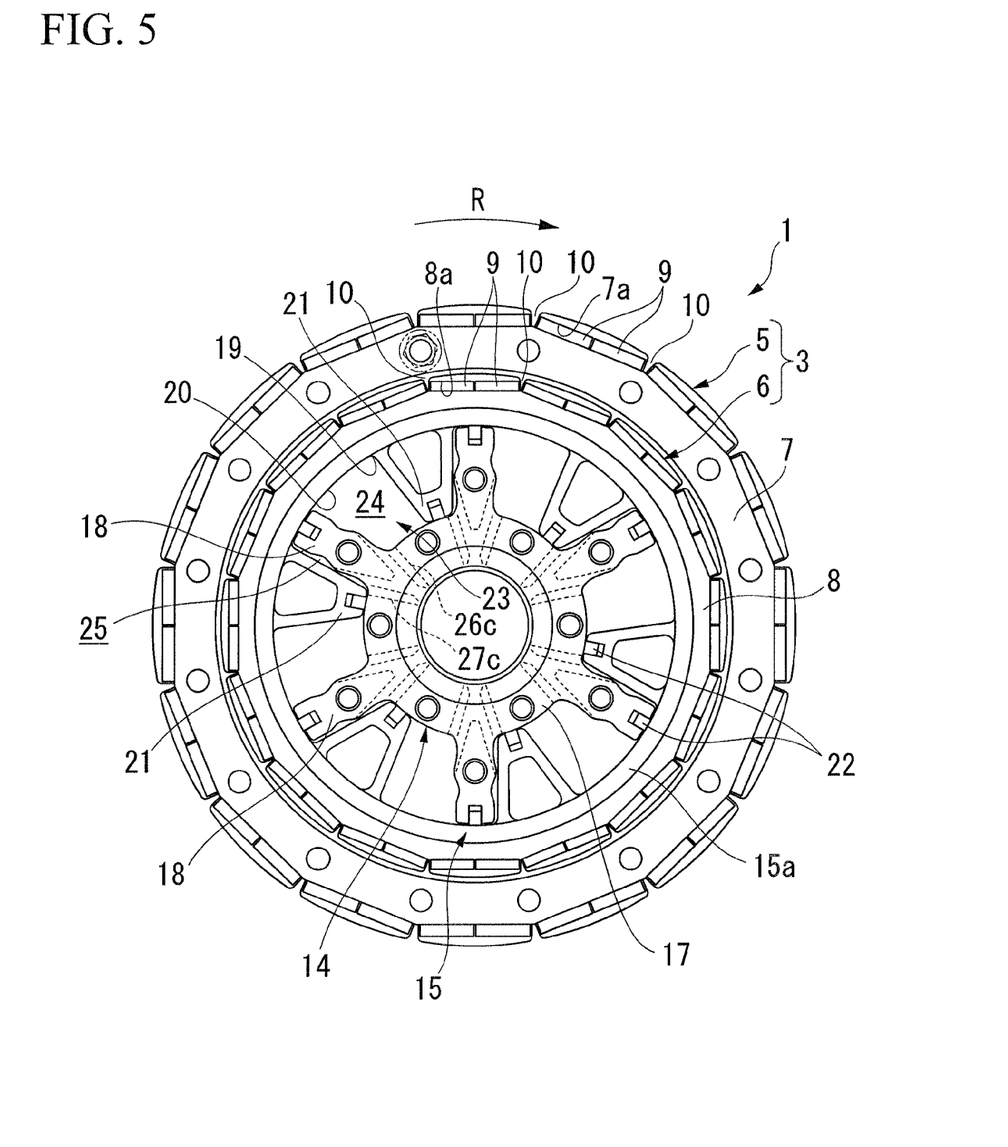
FIG. 5 is a side view that excludes some components, showing the rotor unit which is controlled to the most advanced position of the motor according to the embodiment.
Figure 6A:
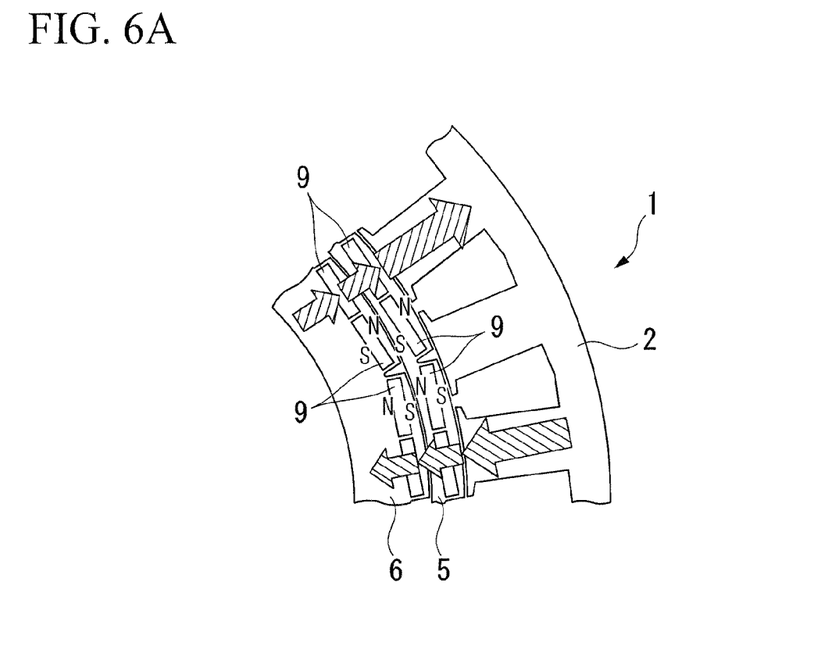
FIG. 6A is a schematic view showing a field forcing state in which permanent magnets of an inner rotor and permanent magnets of an outer rotor of the motor are arranged in a same polarity arrangement according to the embodiment of the present invention.

In this case, "advance" refers to advancing the inner rotor 6 in the rotation direction of the motor 1 shown by the arrow R in FIG. 3 and FIG. 5 with respect to the outer rotor 5, and "retard" refers to advancing the inner rotor 6 to the reverse side of the rotation direction R of the motor 1 with respect to the outer rotor 5.

Also, supply and discharge of the operating fluid for the advance operation chamber 24 and the retard operation chamber 25 are performed through the rotation axis 4. Specifically, the advance operation chamber 24 is connected to an advance side supply/discharge passage 26 of the hydraulic pressure control device 13 shown in FIG. 7; and the retard operation chamber 25 is connected to a retard side supply/discharge passage 27 of the same hydraulic pressure control device 13. Moreover, a portion of the advance side supply/discharge passage 26 and the retard side supply/discharge passage 27 is, as shown in for example in FIG. 2, constituted by passage holes 26a, 27a that are formed in the rotation axis 4 along the axial direction. Then, the end portion of each passage hole 26a, 27a is connected to an annular groove 26b and annular groove 27b that are formed at two positions in the outer circumferential surface of the rotation axis 4 offset in the axial direction, and these annular grooves 26b, 27b are connected to a plurality of conduction holes 26c, 27c that are formed in the boss portion 17 of the vane rotor 14 in the radial direction. Each conduction hole 26c of the advance side supply/discharge passage 26 connects the annular groove 26b and each advance operation chamber 24; and each conduction hole 27c of the retard side supply/discharge passage 27 connects the annular groove 27b and each retard operation chamber 25.

Figure 6B:
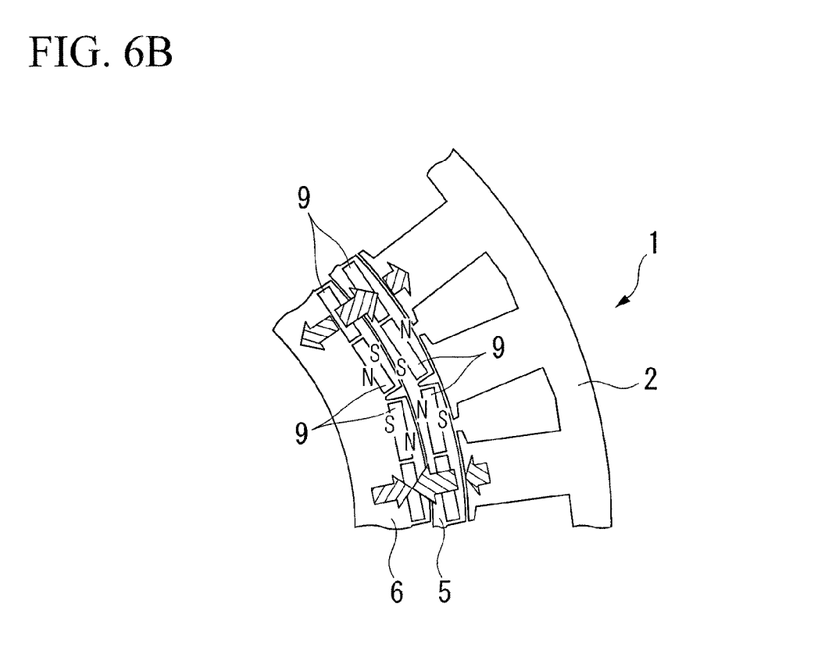
FIG. 6B is a schematic view showing a field weakening state in which the permanent magnets of the inner rotor and the permanent magnets of the outer rotor of the motor are arranged in different polarity arrangements according to the embodiment of the present invention.

The motor 1 of the present embodiment is set so that, when the inner rotor 6 is in the most retard position with respect to the outer rotor 5, the permanent magnets 9 of the outer rotor 5 and the inner rotor 6 each face different poles, leading to a strong magnetic field state (for example, refer to FIG. 3 and FIG. 6A), and when the inner rotor 6 is in the most advance position with respect to the outer rotor 5, the permanent magnets 9 of the outer rotor 5 and the inner rotor 6 each face the same pole, leading to a weak magnetic field state (for example, refer to FIG. 5 and FIG. 6B).

Note that the motor 1 can arbitrarily change the strong magnetic field state and weak magnetic field state by supply/discharge control of the operating fluid with respect to the advance side operation chamber 24 and the retard side operation chamber 25, but when the strength of the magnetic field is thus changed, the induced voltage constant Ke thereby changes, and as a result the characteristics of the motor 1 are changed. That is, when the induced voltage constant Ke becomes large due to a strong magnetic field, the allowable rotational speed at which the motor 1 can be operated will fall, but the maximum torque that can be output increases. Conversely, when the induced voltage constant Ke becomes small due to a weak magnetic field, the maximum torque that can be output by the motor 1 decreases, but the allowable rotational speed at which the motor 1 can be operated increases.

The hydraulic pressure control device 13, as shown in FIG. 7 for example, is provided with an oil pump (EOP) 32 that pumps up operating fluid from an oil tank (not illustrated) and emits it into passages; a regulator valve 35 that adjusts the hydraulic pressure of the operating fluid that is discharged from the oil pump 32 to introduce it to a line passage 33 and passes the excess portion of the operating fluid to a low-pressure passage 34 for lubricating and cooling various devices; and a channel selector 37 that distributes the operating fluid that is introduced to the line passage 33 to the advance side supply/discharge passage 26 and the retard side supply/discharge passage 27 and discharges the operating fluid that is not required by the advance side supply/discharge passage 26 and the retard side supply/discharge passage 27 to a drain passage 36.

The regulator valve 35 accepts the pressure of the line passage 33 as a control pressure and distributes the operating fluid by balance with a counterforce spring 38.

Also, the channel selector 37 has an electromagnetic solenoid 37b that advances and retracts a control spool 37a. The electromagnetic solenoid 37b is controlled by the control apparatus 100a.

The control apparatus 100a, as shown in FIG. 1, is provided with a motor control portion 40, a PDU (power drive unit) 41, and a battery 42.

The PDU 41, for example, is provided with a PWM inverter that performs pulse width modulation using a bridge circuit which uses a plurality of transistor switching devices in a bridge connection, and is connected to the high-voltage battery 42 that performs transfer of electrical energy with the motor 1.

While driving, for example, the motor 1 and the like, the PWM inverter switches between the ON (conducting) and OFF (cutoff) states of each of the transistors forming pairs for each phase, based on gate signals (that is, PWM signals) which are switching instructions input from the motor control portion 40, and thereby converting the DC power supplied from the battery 42 into three-phase AC power. Through alternate commutation to supply current to the stator windings 2a of the motor 1, causes alternating U-phase current Iu, V-phase current Iv, and W-phase current Iw to flow in the stator windings 2a for each phase.

The motor control portion 40, as shown in FIG. 1 for example, performs feedback control of current in dq coordinates, which form a rotating orthogonal coordinate system. The motor control portion 40 computes a d-axis target current Idc and a q-axis target current Iqc based on a torque command value Tq that is computed based on the detection result of the accelerator pedal opening sensor that detects the accelerator opening according to the accelerator operation by the driver, calculates output voltages Vu, Vv, Vw for each phase based on the d-axis target current Idc and q-axis target current Iqc, and inputs PWM signals that are gate signals to the PDU 41 in accordance with the output voltages Vu, Vv, Vw for each phase. Further, the motor control portion 40 converts two phase currents among the phase currents Iu, Iv, Iw actually supplied from the PDU 41 to the motor 1 into currents in dq coordinates, and obtains a d-axis current Id and a q-axis current Iq. Further, the motor control portion 40 performs control such that deviation of the d-axis current Id from the d-axis target current Idc and deviation of the q-axis current Iq from the q-axis target current Iqc are zero.

This motor control portion 40 includes, for example, a target current setting unit 51; a current deviation calculating portion 52; a magnetic field controller 53; an electrical power controller 54; a current controller 55; a dq/three-phase converter 56; a PWM signal generator 57; a filter processor 58; a three-phase/dq converter 59; a rotational frequency calculator 60; an induced voltage constant calculator 62; an induced voltage constant command output portion 63; an induced voltage constant difference calculator 64; a phase controller 65; a memory 66; and a fail detection controller 67.

Input to this motor control portion 40 are: detection signals Ius, Iws output from the current sensors 81 which detect the U-phase current Iu and W-phase current Iw among the three phase currents Iu, Iv, Iw output from the PDU 41 to the motor 1; detection signals output from a voltage sensor 82 which detects terminal voltage (power supply voltage) VB of the battery 42; detection signals output from a rotation sensor 83 which detects the rotor rotation angle θM of the motor 1 (that is, the rotation angle of the magnetic poles of the rotor unit 3 from a predetermined reference rotation position, for example, the rotation angle of the outer rotor 5 rotating with the rotation axis 4 as one, that is detected by a resolver or the like); detection signals output from a phase position sensor 84 that detects a phase position θ (for example, the relative phase of the inner rotor 6 to the outer rotor 5 which is calculated based on a rotation angle of the inner rotor 6 which is detected by a resolver or the like) with respect to the relative phase between the outer rotor 5 and the inner rotor 6; detection signals output from the wheel speed sensors NW which detect rotation speed (wheel speed) of the wheels of the vehicle 100; detection signals output from the liquid temperature sensor To which detects the temperature of the operating fluid (for example, oil temperature) of the rotation mechanism 11, and the like.

The phase position sensor 84 can detect occurrences of various failures, and output fail information based on the detection results.

The target current setting unit 51 computes current instructions specifying each of the phase currents Iu, Iv, Iw to be supplied to the motor 1 from the PDU 41, based on torque instructions Tq (for example, instruction values to cause the motor 1 to generate the torque required in response to the amount of operation of depression of the acceleration pedal AP by the driver) input from an external control device (not shown) and the rotation frequency NM of the motor 1 input from the rotational frequency calculator 60. These current instructions are output to the current deviation calculating portion 52 as the d-axis target current Idc and q-axis target current Iqc in rotating orthogonal coordinates.

The dq-coordinates which form a rotating orthogonal coordinate system take, for example, the d-axis (magnetic field axis) in the magnetic flux direction of the field pole of the permanent magnet 9 of the outer rotor 5 of the rotor unit 3, and take the q-axis (torque axis) in the direction orthogonal to the d-axis, and rotate in synchronization with the rotation phase of the rotor unit 3 of the motor 1. With this, the d-axis target current Idc and q-axis target current Iqc, which are DC signals, are applied as current instructions for AC signals supplied to each of the phases of the motor 1 from the PDU 41.

Further, the target current setting unit 51 sets zero as the torque instruction Tq when a fail-mode instruction is input from a fail-decision control unit 67.

The current deviation calculating portion 52 is provided with: a d-axis current deviation calculating portion 52a that calculates the deviation ΔId between the d-axis target current Idc to which is added a d-axis correction current that is input from the magnetic field controller 53 and the d-axis current Id; and a q-axis current deviation calculating portion 52b that calculates the deviation ΔIq between the q-axis target current Iqc to which is added a q-axis correction current that is input from the electrical power controller 54 and the q-axis current Iq.

Note that the magnetic field controller 53 outputs the target value to the d-axis current deviation calculating portion 52a as a d-axis correction current. The target value is for the field weakening current of the field weakening control that controls the current phase by equivalently weakening the magnetic field amount of the rotor unit 3 for suppressing increases in the back induced voltage accompanying an increase in the rotation frequency NM of the motor 1.

Also, the electrical power controller 54 outputs the q-axis correction current for correcting the q-axis target current Iqc in accordance with a suitable electrical power control for the residual capacity of the battery 42 to the q-axis current deviation calculating portion 52b.

The current controller 55, by means of a PI (proportional integration) operation according to the motor rotation frequency NM, performs controlled amplification of the deviation ΔId to calculate a d-axis voltage instruction value Vd, and performs controlled amplification of the deviation ΔIq to calculate a q-axis voltage instruction value Vq.

The dq/three-phase converter 56 uses the rotation angle θM of the rotor unit 3 input from the rotational frequency calculator 60 to convert the d-axis voltage instruction value Vd and q-axis voltage instruction value Vq in dq-coordinates into a U-phase output voltage Vu, V-phase output voltage Vv, and W-phase output voltage Vw, which are voltage instruction values in three-phase AC coordinates which is a static coordinate system.

The PWM signal generator 57 uses pulse-width modulation based on the sine-wave output voltages Vu, Vv, and Vw for each phase, a sawtooth-wave carrier signal, and a switching frequency, to generate gate signals (that is, PWM signals) which are switching instructions including pulses to drive and turn ON/OFF each of the switching devices of the PWM inverter in the PDU 41.

The filter processor 58 performs filter processing such as high frequency component removal and the like to extract as physical quantities each of the phase currents Iu, Iw from the detection signals Ius, Iws for each of the phase currents detected by the current sensors 81.

The three-phase/dq converter 59 calculates the d-axis current Id and q-axis current Iq in rotating coordinates, that is, dq-coordinates, for the rotation phase of the motor 1 with the phase currents Iu, Iw which are extracted by the filter processor 58 and the rotation angle θM of the rotor unit 3 input from the rotational frequency calculator 60.

The rotational frequency calculator 60 extracts the rotation angle θM of the rotor unit 3 of the motor 1 from the detection signals output from the rotation sensor 83 and calculates motor rotation frequency NM of the motor 1 based on the rotation angle θM.

The induced voltage constant calculating portion 62 calculates the induced voltage constant Ke corresponding to the relative phase between the inner rotor 6 and the outer rotor 5, based on the phase position θ output from the phase position sensor 84.

The induced voltage constant command output portion 63 outputs instruction value Kec (induced voltage constant instruction) based on the torque instruction Tq, the rotation frequency NM, and the power supply voltage VB.

Further, when the fail mode instruction is input from the fail-decision control unit 67, the induced voltage constant instruction output portion 63 output a control instruction for failure to set the relative phase as a most forcing phase corresponding to the forcing field which is the strongest in the phase variable area or a most weakening phase corresponding to the weakening field which is the most weak in the phase variable area, and outputs an OFF instruction for stopping an ordinary control (phase stepless control) which changes the relative phase steplessly in accordance with an induced voltage constant difference ΔKe.

The induced voltage constant difference calculator 64 outputs the induced voltage constant difference ΔKe obtained by subtracting the induced voltage constant Ke which is output from the induced voltage constant calculator 62 from induced voltage constant instruction value Kec which is output from the induced voltage constant instruction output portion 63.

The phase controller 65 outputs a control instruction θc for controlling the relative phase so that the induced voltage constant difference ΔKe becomes zero in accordance with the induced voltage constant difference ΔKe which is output from the induced voltage constant difference calculator 64.

Further, the phase control unit 65 stops outputting the control instruction θc according to the induced voltage constant difference ΔKe when an OFF instruction is input from the induced voltage constant instruction output portion 63.

The memory 66 stores data such as threshold values which are referred to for various decision processes in the fail-decision control unit 67.

The fail-decision control unit 67 outputs fail-mode instructions (for example, instruction for setting a flag value as "1" of a sensor fail-mode flag indicating that the phase sensor fail-mode is performed) based on a fail information (for example, information for setting a flag value as "1" of a sensor fail flag indicating that the phase position sensor 84 is failed) which is output from the phase position sensor 84.

The motor control apparatus in the present embodiment (that is, the control apparatus 100a) has the above-described constitution. Next, operation of the control apparatus 100a, especially a process of phase control of the phase position sensor 84 in a fail-state, will be described below.

The processes of the phase sensor fail decision will be described below.

Figure 8:
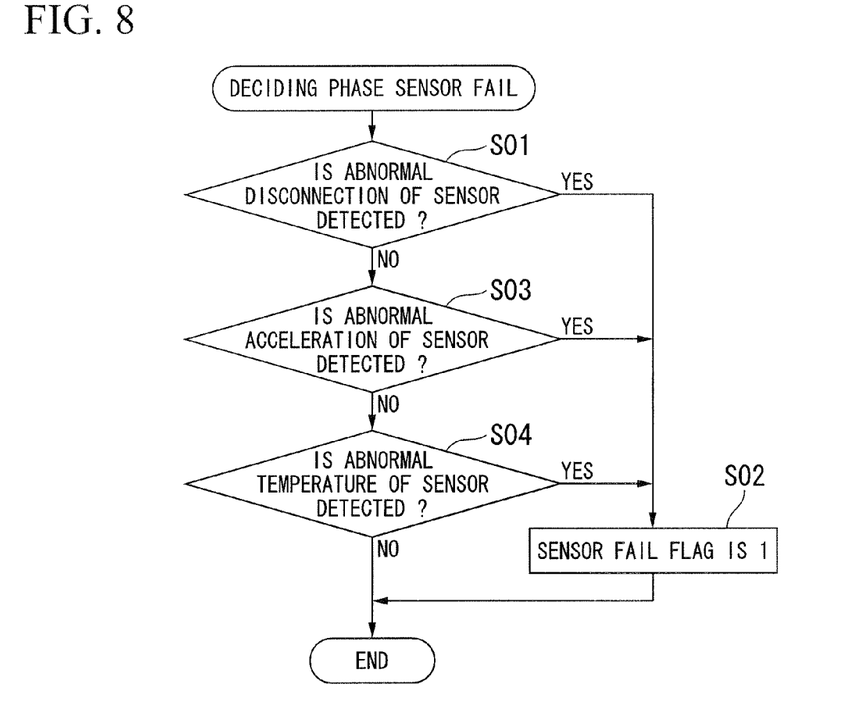
FIG. 8 is a flow chart showing processes of deciding a phase sensor fail according to the embodiment of the present invention.

Step S01 shown in FIG. 8, it is determined whether or not a problem of disconnection of sensor in the phase position sensor 84 is detected.

If the determination is "YES", then the flow advances to step S02. In step S02, a flag value of the sensor fail flag is set to "1", and then the process ends.

If the determination is "NO", then the flow advances to step S03.

Next, in step S03, it is determined whether or not abnormal acceleration of the sensor is detected. The abnormal acceleration of the sensor is a state in which a speed or an acceleration obtained from the phase position θ which is detected by the phase position sensor 84 is out of a prescribed range.

If the determination is "YES", then the process advances to the above-described step S02.

If the determination is "NO", then the process advances to step S04.

Next, in step S04, it is determined whether or not abnormal temperature of the sensor is detected. The abnormal temperature of the sensor is a state in which the temperature of the phase position sensor 84 is out of a prescribed area.

If the determination is "YES", then the process advances to the above-described step S02.

If the determination is "NO", the process ends.

The process when there is a phase sensor fail will be described below.

Figure 9:
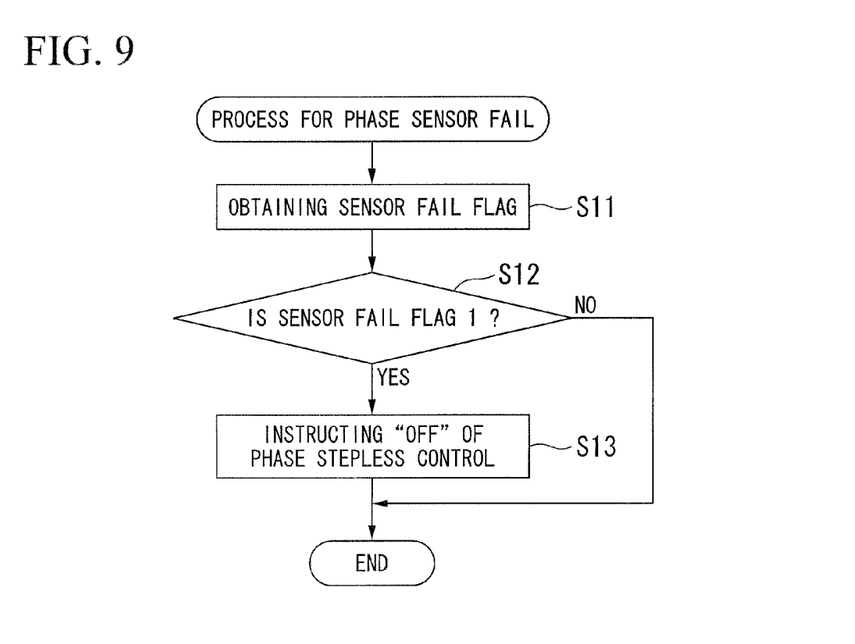
FIG. 9 is a flow chart showing processes when the phase sensor fail occurs according to the embodiment of the present invention.

First, step S11 shown in FIG. 9, a flag value of the sensor fail flag is obtained.

Next, in step S12, it is determined whether or not the flag value of the sensor fail flag is "1".

If the determination is "NO", the process ends.

If the determination is "YES", then the process advances to step S13.

Next, in step S13, an OFF instruction which stops an execution of a normal control (phase stepless control) in which the relative phase is steplessly changed in accordance with the induced voltage constant difference ΔKe is output, and then the process ends.

The process in the sensor fail mode will be described below.

Figure 10:
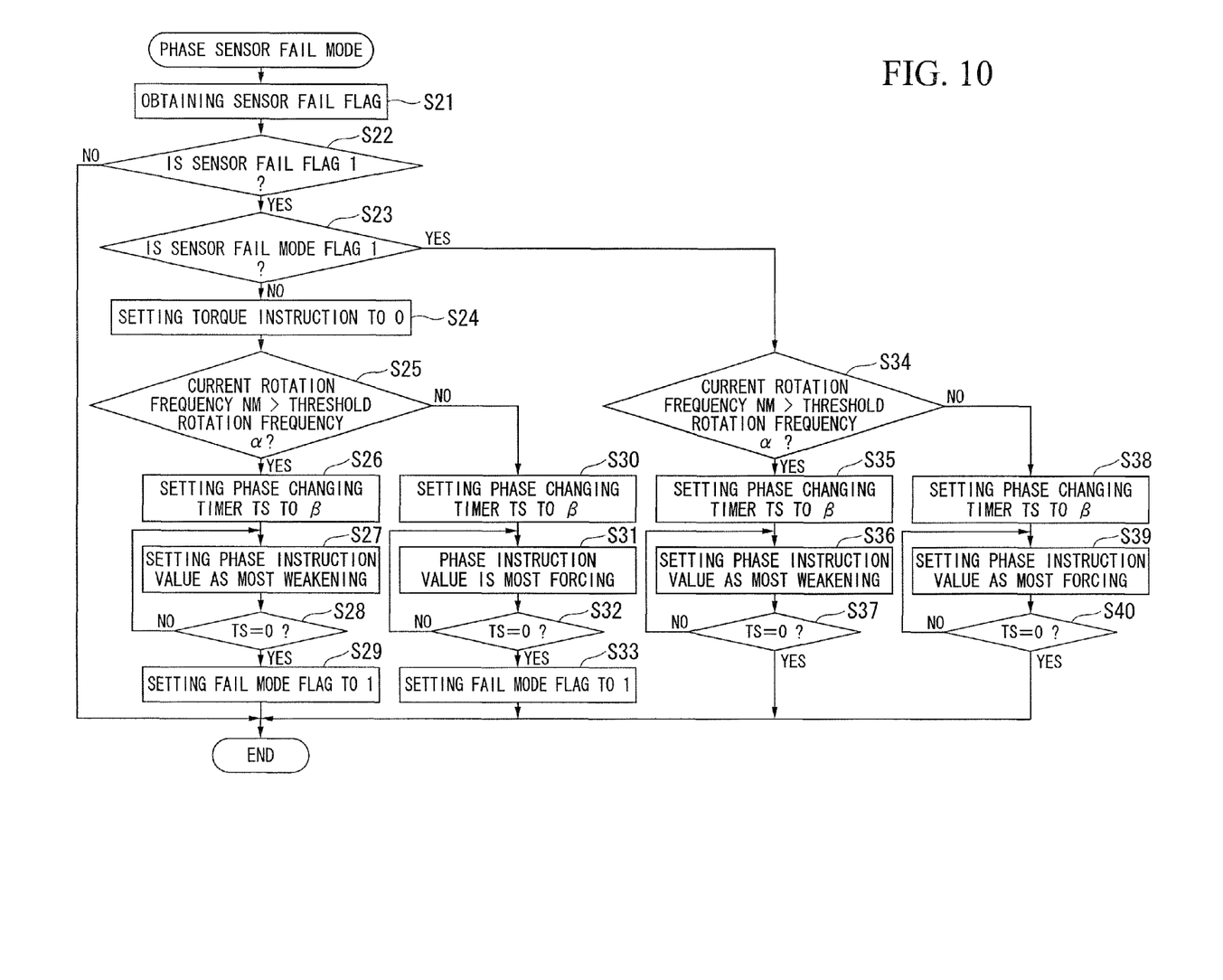
FIG. 10 is a flow chart showing processes of a phase sensor fail mode according to the embodiment of the present invention.

First, in step S21 shown in FIG. 10, the flag value of the sensor fail flag is obtained.

Next, in step S22, it is determined whether or not the flag value of the sensor fail flag is "1".

If the determination is "NO", the process ends.

If, the determination is "YES", then the process advances to step S33.

Next, in step S32, it is determined whether or not the flag value of the sensor fail flag is "1".

If the determination is "YES", then the process advances to the above-described step S34.

If the determination is "NO", the process advances to step S24.

Next, in step S24, the torque instruction Tq is set to zero.

Next, in step S25, it is determined whether or not the rotation frequency NM at this time is larger than a prescribed threshold rotation frequency "α".

If the determination is "NO", then the process advances to step S30.

If, the determination is "YES", the process advances to step S26.

Next, in step S26, the value of a phase changing timer TS, which is a timer value of a subtraction timer, is set to a prescribed time β (for example, 3 seconds).

Next, in step S27, a phase position for setting the relative phase to the weakening phase corresponding to the weakening field which is the weakest in the phase variable area is set as a phase instruction value.

Next, in step S28, it is determined whether or not the phase changing timer TS is "zero".

If the determination is "NO", then the process returns to the above-described step S27.

If the determination is "YES", then the process advances to step S29. In step S29, the flag value of the fail mode flag is set to "1", and then the process ends.

Further, in step S30, the phase changing timer TS, which is the timer value of the subtraction timer, is set to a subscribed time β (for example, 3 seconds).

Next, in step S31, a phase position for setting the relative phase to the forcing phase corresponding to the forcing field which is the strongest in the phase variable area is set as a phase instruction value.

Next, in step S32, it is determined whether or not the phase changing timer TS is "zero".

If the determination is "NO", the process returns to the above-described step S31.

If the determination is "YES", then the process advances to step S33. In step S33, the flag value of the fail mode flag is set to "1", and the process ends.

Further, in step S34, it is determined whether or not the rotation number NM at this time is larger than a prescribed threshold rotation frequency "α".

If the determination is "NO", then the process advances to step S38.

If, the determination is "YES", the process advances to step S35.

Next, in step S35, the phase changing timer TS, which is the timer value of the subtraction timer, is set to the prescribed time β (for example, 3 seconds, for changing the phase position θ).

Next, in step S36, a phase position for setting the relative phase to the weakening phase corresponding to the weakening field which is the weakest in the phase variable area is set as a phase instruction value.

Next, in step S37, it is determined whether or not the phase changing timer TS is "zero".

If the determination is "NO", then the process returns to the above-described step S36.

If the determination is "YES", then the process ends.

Further, in step S38, the phase changing timer TS, which is the timer value of the subtraction timer, is set to a subscribed time β (for example, 3 seconds).

Next, in step S39, a phase position for setting the relative phase to the forcing phase corresponding to the forcing field which is the strongest in the phase variable area is set as a phase instruction value.

Next, in step S40, it is determined whether or not the phase changing timer TS is "zero".

If the determination is "NO", the process advances to the above-described step S39.

If the determination is "YES", then the process ends.

Figure 11:
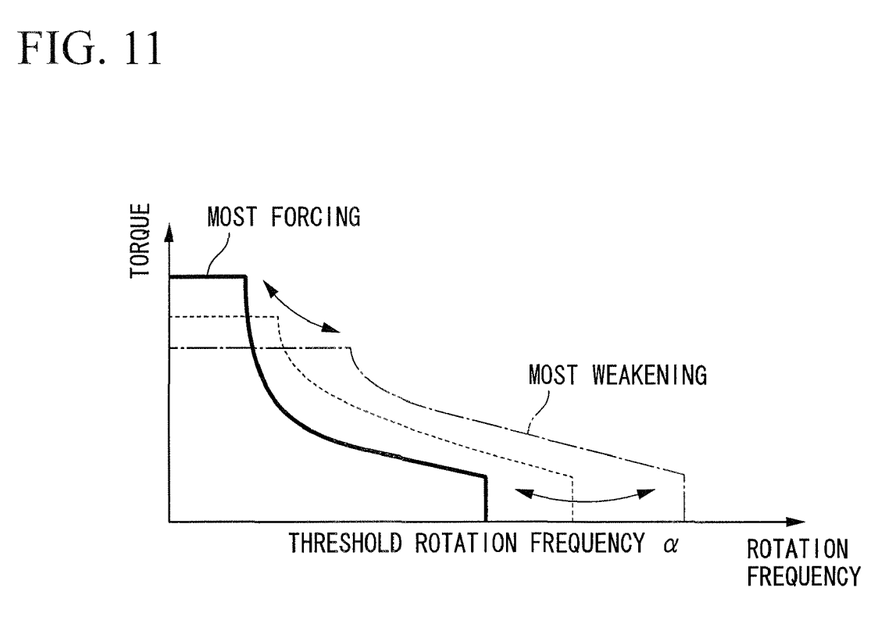
FIG. 11 is a graph showing an example of an available power of the motor corresponding to a maximum value or a minimum value in a phase variable area (i.e., a most forcing phase or a most weakening phase) according to the embodiment of the present invention.

In the above-described process of the phase sensor fail mode, for example, as shown in FIG. 11, by setting the maximum rotation number at the prescribed most forcing phase as the threshold rotation frequency α, in a state in which the phase position sensor 84 does not work, the available power can be set within a range corresponding to the most forcing phase or the most weakening phase.

As described above, according to the motor control apparatus of the present embodiment, even though the detection value of the phase position θ cannot be obtained when the phase position sensor 84 does not work, the phase position θ can be switchably set to ether the maximum value or the minimum value (the most forcing phase or the most weakening phase) in the phase variable area. Therefore, the output of the motor 1 can be controlled based on the phase position θ which is set to ether the maximum value or the minimum value in the phase variable area. As a result, the available power of the motor 1 can be prevented from being reduced excessively; thereby ensuring a prescribed amount of power.

Furthermore, since the phase position θ is set to the maximum value or the minimum value in the phase variable area in accordance with the rotation number NM of the motor 1, the prescribed amount of power can be suitably ensured by setting the phase position to the weakening field side when the rotation number NM of the motor 1 is relatively fast, and setting the phase position to the forcing field when the rotation number NM of the motor 1 is relatively slow.

In addition, inappropriate actions such as an excessive increase in the torque of the motor 1, a vibration, and the like can be prevented by setting a torque instruction value Tq to the motor 1 as zero immediately after detecting a failure of the phase position sensor.

In the above-described embodiment, the phase position θ is set to either the most forcing phase or the most weakening phase in accordance to the rotation number NM of the motor 1 when the phase position sensor 84 does not work. However, the present invention is not limited to the above embodiment. For example, in accordance with the field weakening current instruction (that is, the d-axis target current Idc), the rotation property of the vehicle 100 (for example, the rotation speed of the driving shaft), and the like, the phase position θ can be switched to the most forcing phase or the most weakening phase.

Note that the present invention is not limited to the aforementioned embodiments, and, for example, may be applied to an electric automobile other than a hybrid vehicle, and without being limited to the case of application to a vehicle, and may be applied to a motor that is equipped with another apparatus other than the aforementioned vehicle.

While preferred embodiments of the invention have been described and illustrated above, it should be understood that these are exemplary aspects of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A motor control apparatus comprising:
   an electric motor having a plurality of rotors which can alter mutual relative phases;
   a phase alternation device which alters the relative phase;
   a phase position sensor which detects a phase position with respect to the relative phase;
   a fail-detection device which detects a failure of the phase position sensor; and
   a switch setting device which sets the relative phase as a maximum value or a minimum value in a phase variable area of the phase alternation device in accordance with a rotational speed of the electric motor when the phase position sensor does not work.

2. The motor control apparatus according to claim 1 further comprising a torque setting device which sets a torque instruction value of the electric motor to zero immediately after the fail-detection device detects a failure in the phase position sensor.

3. A motor control apparatus comprising:
   an electric motor having a plurality of rotors which can alter mutual relative phases;
   a phase alternation device which alters the relative phase;
   a phase position sensor which detects a phase position with respect to the relative phase;
   a fail-detection device which detects a failure of the phase position sensor; and
   a switch setting device which sets the relative phase as a maximum value or a minimum value in a phase variable area of the phase alternation device in accordance with a field weakening current instruction when the phase position sensor does not work.

4. A motor control apparatus comprising:
   an electric motor having a plurality of rotors which can alter mutual relative phases;
   a phase alternation device which alters the relative phase;
   a phase position sensor which detects a phase position with respect to the relative phase;
   a fail-detection device which detects a failure of the phase position sensor; and
   a switch setting device which sets the relative phase as a maximum value or a minimum value in a phase variable area of the phase alternation device in accordance with the rotation property of a vehicle which is provided with the electric motor when the phase position sensor does not work.

* * * * *